(12) United States Patent
Belghoul et al.

(10) Patent No.: US 11,388,676 B2
(45) Date of Patent: Jul. 12, 2022

(54) POWER-EFFICIENT BODY PROXIMITY SENSING FOR MMWAVE SYSTEMS

(71) Applicant: Apple Inc., Cupertino, CA (US)

(72) Inventors: Farouk Belghoul, Campbell, CA (US); Firouz Behnamfar, San Jose, CA (US); Rafael L. Rivera-Barreto, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/234,930

(22) Filed: Apr. 20, 2021

(65) Prior Publication Data

US 2021/0352592 A1    Nov. 11, 2021

Related U.S. Application Data

(60) Provisional application No. 63/020,901, filed on May 6, 2020.

(51) Int. Cl.
*H04W 52/18* (2009.01)
*H04W 72/04* (2009.01)
*H04W 76/28* (2018.01)

(52) U.S. Cl.
CPC .......... *H04W 52/18* (2013.01); *H04W 72/04* (2013.01); *H04W 76/28* (2018.02)

(58) Field of Classification Search
CPC ..... H04W 52/18; H04W 76/28; H04W 72/04; H04L 1/0026
USPC .................................................. 455/522.69
See application file for complete search history.

(56) References Cited

U.S. PATENT DOCUMENTS

| | | | | |
|---|---|---|---|---|
| 10,812,125 | B1* | 10/2020 | Badic | H04W 72/085 |
| 10,897,318 | B2* | 1/2021 | Rimini | H04B 1/04 |
| 11,064,439 | B2* | 7/2021 | Yerramalli | H04W 52/0251 |
| 11,146,343 | B2* | 10/2021 | Rimini | H04Q 9/00 |

(Continued)

FOREIGN PATENT DOCUMENTS

| | | | |
|---|---|---|---|
| WO | WO-2020259852 A1 | * | 12/2020 |
| WO | WO-2021067529 A1 | * | 4/2021 |
| WO | WO-2021229503 A1 | * | 11/2021 |

OTHER PUBLICATIONS

Cleveland, Jr., Robert F. et al.; "Evaluating Compliance with FCC Guidelines for Human Exposure to Radiofrequency Electromagnetic Fields"; OET Bulletin 65; Edition 97-01; Federal Communications Commissions Office of Engineering & Technology; Aug. 1997.

*Primary Examiner* — Hai V Nguyen
(74) *Attorney, Agent, or Firm* — Eschweiler & Potashnik, LLC

(57) ABSTRACT

A user equipment (UE), or other network component can operate to generate new radio (NR) communications in millimeter wave (mmW) frequencies. Body proximity sensing (BPS) operations can be performed to determine whether a maximum permissible exposure (MPE) event is triggered. A safe transmit power level associated with the one or more bands can then be used to provide the NR communications. Additionally, determinations of whether various conditions are satisfied to suspend the BPS operations for a period can be evaluated and implemented. The BPS can be configured such that a BPS period of the BPS operations are aligned with a discontinuous reception (DRX) cycle at a beginning of a DRX on-duration of a DRX cycle, wherein the one or more conditions comprise a DRX idle time or state.

20 Claims, 10 Drawing Sheets

(56) References Cited

U.S. PATENT DOCUMENTS

| | | | | |
|---|---|---|---|---|
| 11,165,477 | B2* | 11/2021 | Brunel | H04B 7/0656 |
| 2019/0110254 | A1* | 4/2019 | Yerramalli | H04L 1/001 |
| 2020/0076488 | A1* | 3/2020 | Brunel | H04B 7/0617 |
| 2020/0336222 | A1* | 10/2020 | Rimini | H04B 1/04 |
| 2020/0382187 | A1* | 12/2020 | Brunel | H04B 7/043 |
| 2021/0126719 | A1* | 4/2021 | Rimini | H04W 52/367 |
| 2021/0175919 | A1* | 6/2021 | Badic | H04W 52/30 |
| 2021/0266976 | A1* | 8/2021 | Taherzadeh Boroujeni | H04W 74/006 |
| 2021/0282097 | A1* | 9/2021 | Imana | H04W 52/38 |
| 2021/0297104 | A1* | 9/2021 | Zhou | H04L 25/0226 |
| 2021/0297959 | A1* | 9/2021 | Zhou | H04W 72/042 |
| 2021/0306022 | A1* | 9/2021 | Fernando | H04B 1/3833 |
| 2021/0345410 | A1* | 11/2021 | Zhou | H04W 52/241 |
| 2021/0409129 | A1* | 12/2021 | Rimini | H04B 17/13 |
| 2022/0014247 | A1* | 1/2022 | Brunel | H04B 7/0413 |
| 2022/0030525 | A1* | 1/2022 | Chincholi | H04W 52/367 |

\* cited by examiner

400

| Frequency Range (MHz) | Electric Field Strength (E) (V/m) | Magnetic Field Strength (H) (A/m) | Power Density (S) (mW/cm$^2$) | Averaging Time $|E|^2, |H|^2$ or S (minutes) |
|---|---|---|---|---|
| 0.3-1.34 | 614 | 1.63 | (100)* | 30 |
| 1.34-30 | 824/f | 2.19/f | (180/f$^2$)* | 30 |
| 30-300 | 27.5 | 0.073 | 0.2 | 30 |
| 300-1500 | -- | -- | f/1500 | 30 |
| 1500-100,000 | -- | -- | 1.0 | 30 | f = frequency in MHz       *Plane-wave equivalent power density

FIG. 4

POWER-EFFICIENT BODY PROXIMITY SENSING FOR MMWAVE SYSTEMS

CROSS-REFERENCE TO RELATED APPLICATIONS

The application claims the benefit of U.S. Provisional Patent Application 63/020,901 filed May 6, 2020, entitled "POWER-EFFICIENT BODY PROXIMITY SENSING FOR mmWAVE SYSTEMS", the contents of which are herein incorporated by reference in their entirety.

FIELD

The present disclosure relates to wireless technology, including to discontinuous reception and energy savings in new radio (NR) based unlicensed carrier communications.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

The Bandwidth Part (BWP) was introduced in Fifth Generation (5G) new radio (NR) systems, targeting to flexibly and dynamically configure User Equipment (UE) operating bandwidth to achieve power efficiency. Other devices such as wireless modems comprise user equipments (UEs), Internet of Things (IoT) devices, routers, network storage, Smart TVs, as well as other portable/wireless electronics. These devices are mostly designed to achieve highest data rates on shared spectrum wireless channels.

The human user of such wireless technologies may often be exposed to wireless energy transmitted by multiple client devices when in close proximity. Even though the biological effects of the emitted radio frequency (RF) power to humans is mostly considered harmless, a part of user concerns and preferences include minimizing the exposure to high frequency electromagnetic fields. As such, a wireless network can be configured that performs optimally well and at the same time reduces the RF energy for biological entities working and living in the same network environment to greater ensure biological safety. With the advent of NR unlicensed communication use cases, which are expected to be supported both in coverage and out of coverage, there is a need to consider methods for defining efficient mechanisms for providing power management control among different UEs operating with or without discontinuous (DRX) transmission.

BRIEF DESCRIPTION OF THE DRAWINGS

FIG. 4 is an exemplary data set/table of sub-6 versus millimeter wave (mmW) for regulations according to various aspects described herein.

DETAILED DESCRIPTION

Figure 1:
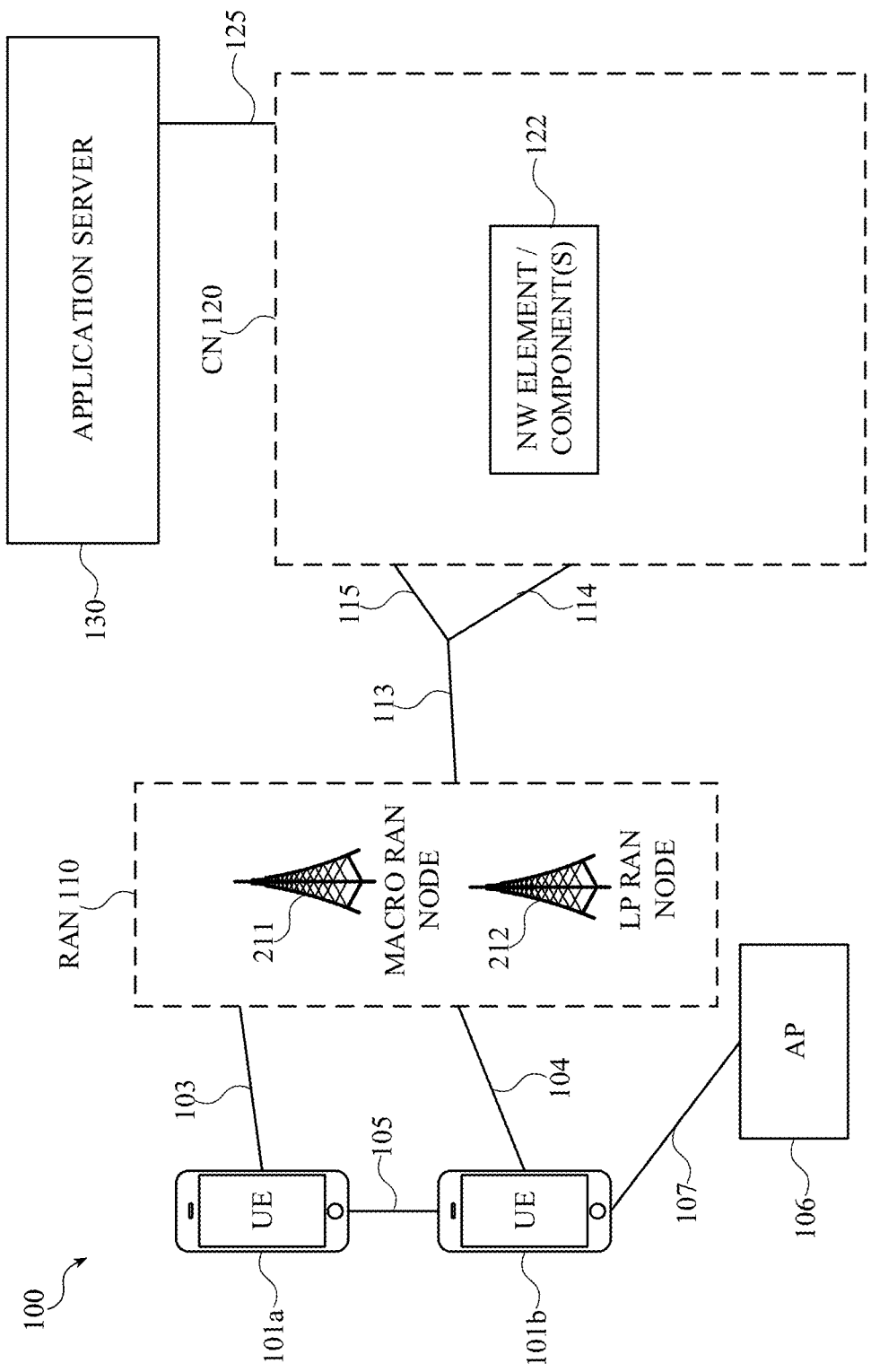
FIG. 1 is an exemplary block diagram illustrating an example of user equipment(s) (UEs) communicatively coupled a network with network components as peer devices useable in connection with various aspects (embodiments) described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

In consideration of various concerns for network connectivity and body proximity sensing (BPS) operations, various aspects or aspects enable network devices to decide whether a biological entity, biological presence (e.g., a human entity/presence) is located within a certain distance, proximity or vicinity with respect to or from a wireless device (e.g., a user equipment, access point, or the like) operating in millimeter (mm) waves (mmWave/mmW), or other network device (eNodeB (eNB), gNodeB (gNB), or other network component) facilitating communications with a network. As such, aspects/aspects herein illustrate how a wireless network and associated devices can be configured to optimally perform with power efficiency and at the same time reduces the RF energy for biological entities working and living in the same environment.

BPS can be configured to detect whether a biological entity or human body is within a particular distance (e.g., about 15 cm or other distance) of a network device operating mmWave. In response to such detection, the UE or other network device can back-off transmit power. Typically, 60 GHz radar can be utilized for proximity sensing. The default approach in wireless devices is to enable BPS as soon as the device operates in mmW bands. However, this approach can result in excessive power consumption and deplete the battery in a short time. Given that mmW communication typically uses more power than existing LTE technology, combination of BPS and mmW operation exacerbates the power situation of the device. As such, various aspects detail solutions to implement BPS in a power-efficient manner while meeting safety/regulatory demands. Additional aspects and details of the disclosure are further described below with reference to figures.

FIG. 1 illustrates an example architecture of a system 100 of a network, in accordance with various aspects. The following description is provided for an example system 100 that operates in conjunction with the LTE system standards and 5G or NR system standards as provided by 3GPP technical specifications. However, the example aspects are not limited in this regard and the described aspects can apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but can comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, and/or the like.

In some aspects, any of the UEs 101 can be IoT UEs, which can comprise a network access layer designed for low-power IoT applications utilizing short-lived UE connections. An IoT UE can utilize technologies such as M2M or MTC for exchanging data with an MTC server or device via a public land mobile network (PLMN), Proximity Services (ProSe) or Device-to-Device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 can be configured to connect, for example, communicatively couple, with a Radio Access Network (RAN) 110. In aspects, the RAN 110 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in a NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communications interface/layer.

Alternatively, or additionally, each of the UEs 101 can be configured with dual connectivity (DC) as a multi-RAT or multi-Radio Dual Connectivity (MR-DC), where a multiple Rx/Tx capable UE may be configured to utilize resources provided by two different nodes (e.g., 111, 112, or other network nodes) that can be connected via non-ideal backhaul, one providing NR access and the other one providing either E-UTRA for LTE or NR access for 5G, for example. One node can act as a master node (MN) and the other as the secondary node (SN). The MN and SN can be connected via a network interface and at least the MN is connected to the core network 120. At least one of the MN or the SN can be operated with shared spectrum channel access. All functions specified for a UE can be used for an integrated access and backhaul mobile termination (IAB-MT). Similar for UE 101, the IAB-MT can access the network using either one network node or using two different nodes with EN-DC architectures, NR-DC architectures, or the like.

In MR-DC, a group of serving cells associated with a master Node can be configured as a master cell group (MCG), comprising of a special cell (SpCell) as a primary cell (PCell) and optionally one or more secondary cells (SCells). A MCG can be the radio access node that provides the control plane connection to the core network 120; it may be a Master eNB (in EN-DC), a Master ng-eNB (in NGEN-DC) or a Master gNB (in NR-DC and NE-DC), for example. SpCell can either refer to the PCell of the MCG or the PSCell of a second cell group (SCG) depending on if the MAC entity that is associated to the MCG or the SCG, respectively. An SpCell can refer to a PCell of MCG or an SCG. A SCG in MR-DC can be a group of serving cells associated with an SN, comprising of the SpCell as a primary secondary cell (PSCell) and optionally one or more SCells.

In this example, the connections 102 and 104 are illustrated as an air interface to enable communicative coupling, and can be consistent with cellular communications protocols, such as a Global System for Mobile communications (GSM) protocol, a Code-Division Multiple Access (CDMA) network protocol, a Push-to-Talk (PTT) protocol, a PTT over-cellular (POC) protocol, a Universal Mobile Telecommunications Service (UMTS) protocol, a 3GPP LTE protocol, a 5G protocol, a NR protocol, and/or any of the other communications protocols discussed herein. In aspects, the UEs 101 can directly exchange communication data via a ProSe interface 105. The ProSe interface 105 can alternatively be referred to as a SL interface 105 and can comprise one or more logical channels, including but not limited to a physical sidelink control channel (PSCCH), a physical sidelink shared channel (PSSCH), a physical sidelink discovery channel (PSDCH), and a physical sidelink broadcast channel (PSBCH).

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various aspects, the UE 101b, RAN 110, and AP 106 can be configured to utilize LTE-WLAN aggregation (LWA) operation and/or LTE-WLAN Radio Level Integration with IPsec Tunnel (LWIP) operation. The LWA operation can involve the UE 101b in radio resource control RRC_CONNECTED being configured by a RAN node 111a-b to utilize radio resources of LTE and WLAN. LWIP operation can involve the UE 101b using WLAN radio resources (e.g., connection 107) via IPsec protocol tunneling to authenticate and encrypt packets (e.g., IP packets) sent over the connection 107. IPsec tunneling can include encapsulating the entirety of original IP packets and adding a new packet header, thereby protecting the original header of the IP packets.

The RAN 110 can include one or more access AN nodes or RAN nodes 111a and 111b (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). As used herein, the term "NG RAN node" or the like can refer to a RAN node 111 that operates in an NR or 5G system 100 (for example, a gNB), and the term "E-UTRAN node" or the like can refer to a RAN node 111 that operates in an LTE or 4G system 100 (e.g., an eNB). According to various aspects, the RAN nodes 111 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some aspects, all or parts of the RAN nodes 111 can be implemented as one or more software entities running on server computers as part of a virtual network, which can be referred to as a centralized RAN (CRAN) and/or a virtual baseband unit pool (vBBUP). In these aspects, the CRAN or vBBUP can implement a RAN function split, such as a Packet Data Convergence Protocol (PDCP) split wherein Radio Resource Control (RRC) and PDCP layers are operated by the CRAN/vBBUP and other L2 protocol entities are operated by individual RAN nodes 111; a Media Access Control (MAC)/Physical (PHY) layer split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 can represent individual gNB-Distributed Units (DUs) that are connected to a gNB-Control Unit (CU) via individual F1 interfaces. In these implementations, the gNB-DUs can include one or more remote radio heads or RF front end modules (RFEMs), and the gNB-CU can be operated by a server that is located in the RAN 110 (not shown) or by a server pool in a similar manner as the CRAN/vBBUP. Additionally, or alternatively, one or more of the RAN nodes 111 can be next generation eNBs (gNBs), which are RAN nodes that provide E-UTRA user plane and control plane protocol terminations toward the UEs 101, and are connected to a 5GC via an NG interface.

Any of the RAN nodes 111 can terminate the air interface protocol and can be the first point of contact for the UEs 101. In some aspects, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In aspects, the UEs 101 can be configured to communicate using Orthogonal Frequency-Division Multiplexing (OFDM) communication signals with each other or with any of the RAN nodes 111 over a multicarrier communication channel in accordance with various communication techniques, such as, but not limited to, an OFDMA communication technique (e.g., for downlink communications) or a Single Carrier Frequency-Division Multiple Access (SC-FDMA) communication technique (e.g., for uplink and ProSe or sidelink communications), although the scope of the aspects is not limited in this respect. The OFDM signals can comprise a plurality of orthogonal subcarriers.

In some aspects, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

According to various aspects, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum can include channels that operate in the frequency range of approximately 400 MHz to approximately 2.8 GHz, whereas the unlicensed spectrum can include the 5 GHz band.

The incumbent systems in the 5 GHz band can often be WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node can first perform CCA before transmission. Additionally, a backoff mechanism is used to avoid collisions in situations where more than one WLAN node senses the channel as idle and transmits at the same time. The backoff mechanism can be a counter that is drawn randomly within the contention window size (CWS), which is increased exponentially upon the occurrence of collision and reset to a minimum value when the transmission succeeds. The LBT mechanism designed for LAA is somewhat similar to the CSMA/CA of WLAN. In some implementations, the LBT procedure for downlink (DL) or uplink (UL) transmission bursts including physical downlink shared channel (PDSCH) or physical uplink shared channel (PUSCH) transmissions, respectively, can have an LAA contention window that is variable in length between X and Y extended CCA (ECCA) slots, where X and Y are minimum and maximum values for the CWSs for LAA. In one example, the minimum CWS for an LAA transmission can be 9 microseconds (μs); however, the size of the CWS and a maximum channel occupancy time (MOOT) (for example, a transmission burst) can be based on governmental regulatory requirements.

The LAA mechanisms are built upon carrier aggregation (CA) technologies of LTE-Advanced systems. In CA, each aggregated carrier is referred to as a component carrier (CC). A CC can have a bandwidth of 1.4, 2, 5, 10, 15 or 20 MHz and a maximum of about five CCs or otherwise can be aggregated, and therefore, a maximum aggregated bandwidth can be about 100 MHz, for example. In frequency division duplex (FDD) systems, the number of aggregated carriers can be different for DL and UL, where the number of UL CCs is equal to or lower than the number of DL component carriers. In some cases, individual CCs can have a different bandwidth than other CCs. In time division duplex (TDD) systems, the number of CCs as well as the bandwidths of each CC is usually the same for DL and UL.

CA also comprises individual serving cells to provide individual CCs. The coverage of the serving cells can differ, for example, because CCs on different frequency bands will experience different pathloss. A primary service cell or PCell can provide a primary component carrier (PCC) for both UL and DL, and can handle radio resource control (RRC) and non-access stratum (NAS) related activities. The other serving cells are referred to as SCells, and each SCell can provide an individual secondary component carrier (SCC) for both UL and DL. The SCCs can be added and removed as required, while changing the PCC can require the UE 101 to undergo a handover. In LAA, eLAA, and feLAA, some or all of the SCells can operate in the unlicensed spectrum (referred to as "LAA SCells"), and the LAA SCells are assisted by a PCell operating in the licensed spectrum. When a UE is configured with more than one LAA SCell, the UE can receive UL grants on the configured LAA SCells indicating different PUSCH starting positions within a same subframe.

The PDSCH carries user data and higher-layer signaling to the UEs 101. The physical downlink control channel (PDCCH) carries information about the transport format and resource allocations related to the PDSCH channel, among other things. It can also inform the UEs 101 about the transport format, resource allocation, and Hybrid Automatic Repeat Request (HARQ) information related to the uplink shared channel. Typically, downlink scheduling (assigning control and shared channel resource blocks to the UE 101b within a cell) can be performed at any of the RAN nodes 111 based on channel quality information fed back from any of the UEs 101. The downlink resource assignment information can be sent on the PDCCH used for (e.g., assigned to) each of the UEs 101.

The PDCCH uses control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some aspects can use concepts for resource allocation for control channel information that are an extension of the above-described concepts. For example, some aspects can utilize an extended (E)-PDCCH that uses PDSCH resources for control information transmission. The EPDCCH can be transmitted using one or more ECCEs. Similar to above, each ECCE can correspond to nine sets of four physical resource elements known as an EREGs. An ECCE can have other numbers of EREGs in some situations.

The RAN nodes 111 can be configured to communicate with one another via interface 112. In aspects where the system 100 is an LTE system, the interface 112 can be an X2 interface 112. The X2 interface can be defined between two or more RAN nodes 111 (e.g., two or more eNBs and the like) that connect to evolved packet core (EPC) or core network 120, and/or between two eNBs connecting to EPC 120. In some implementations, the X2 interface can include an X2 user plane interface (X2-U) and an X2 control plane interface (X2-C). The X2-U can provide flow control mechanisms for user data packets transferred over the X2 interface, and can be used to communicate information about the delivery of user data between eNBs. For example, the X2-U can provide specific sequence number information for user data transferred from a master eNB (MeNB) to an secondary eNB (SeNB); information about successful in sequence delivery of PDCP packet data units (PDUs) to a UE 101 from an SeNB for user data; information of PDCP PDUs that were not delivered to a UE 101; information about a current minimum desired buffer size at the SeNB for transmitting to the UE user data; and the like. The X2-C can provide intra-LTE access mobility functionality, including context transfers from source to target eNBs, user plane transport control, etc.; load management functionality; as well as inter-cell interference coordination functionality.

In aspects where the system 100 is a 5G or NR system, the interface 112 can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support can include context transfer from an old (source) serving RAN node 111 to new (target) serving RAN node 111; and control of user plane tunnels between old (source) serving RAN node 111 to new (target) serving RAN node 111. A protocol stack of the Xn-U can include a transport network layer built on Internet Protocol (IP) transport layer, and a GPRS Tunnelling Protocol for User Plane (GTP-U) layer on top of a User Datagram Protocol (UDP) and/or IP layer(s) to carry user plane PDUs. The Xn-C protocol stack can include an application layer signaling protocol (referred to as Xn Application Protocol (Xn-AP)) and a transport network layer that is built on Stream Control Transmission Protocol (SCTP). The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

The RAN 110 is shown to be communicatively coupled to a core network—in this aspect, core network (CN) 120. The CN 120 can comprise a plurality of network elements 122, which are configured to offer various data and telecommunications services to customers/subscribers (e.g., users of UEs 101) who are connected to the CN 120 via the RAN 110. The components of the CN 120 can be implemented in one physical node or separate physical nodes including components to read and execute instructions from a machine-readable or computer-readable medium (e.g., a non-transitory machine-readable storage medium). In some aspects, NFV can be utilized to virtualize any or all of the above-described network node functions via executable instructions stored in one or more computer-readable storage mediums (described in further detail below). A logical instantiation of the CN 120 can be referred to as a network slice, and a logical instantiation of a portion of the CN 120 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more Evolved Packet Core (EPC) components/functions.

Generally, the application server 130 can be an element offering applications that use IP bearer resources with the core network (e.g., Universal Mobile Telecommunications System Packet Services (UMTS PS) domain, LTE PS data services, etc.). The application server 130 can also be configured to support one or more communication services (e.g., VoIP sessions, PTT sessions, group communication sessions, social networking services, etc.) for the UEs 101 via the EPC 120.

In aspects, the CN 120 can be a 5GC (referred to as "5GC 120" or the like), and the RAN 110 can be connected with the CN 120 via an NG interface 112. In aspects, the NG interface 112 can be split into two parts, an Next Generation (NG) user plane (NG-U) interface 114, which carries traffic data between the RAN nodes 111 and a User Plane Function (UPF), and the S1 control plane (NG-C) interface 115, which is a signaling interface between the RAN nodes 111 and Access and Mobility Management Functions (AMFs). The Core network CN 120 can also be a 5GC 120.

In aspects, the CN 120 can be a 5G CN (referred to as "5GC 120" or the like), while in other aspects, the CN 120 can be an evolved packet core (EPC)). Where CN 120 is an EPC (referred to as "EPC 120" or the like), the RAN 110 can be connected with the CN 120 via an S1 interface 112. In aspects, the S1 interface 112 can be split into two parts, an S1 user plane (S1-U) interface 114, which carries traffic data between the RAN nodes 111 and the S-GW, and the S1-MME interface 115, which is a signaling interface between the RAN nodes 111 and MMEs.

Figure 2:
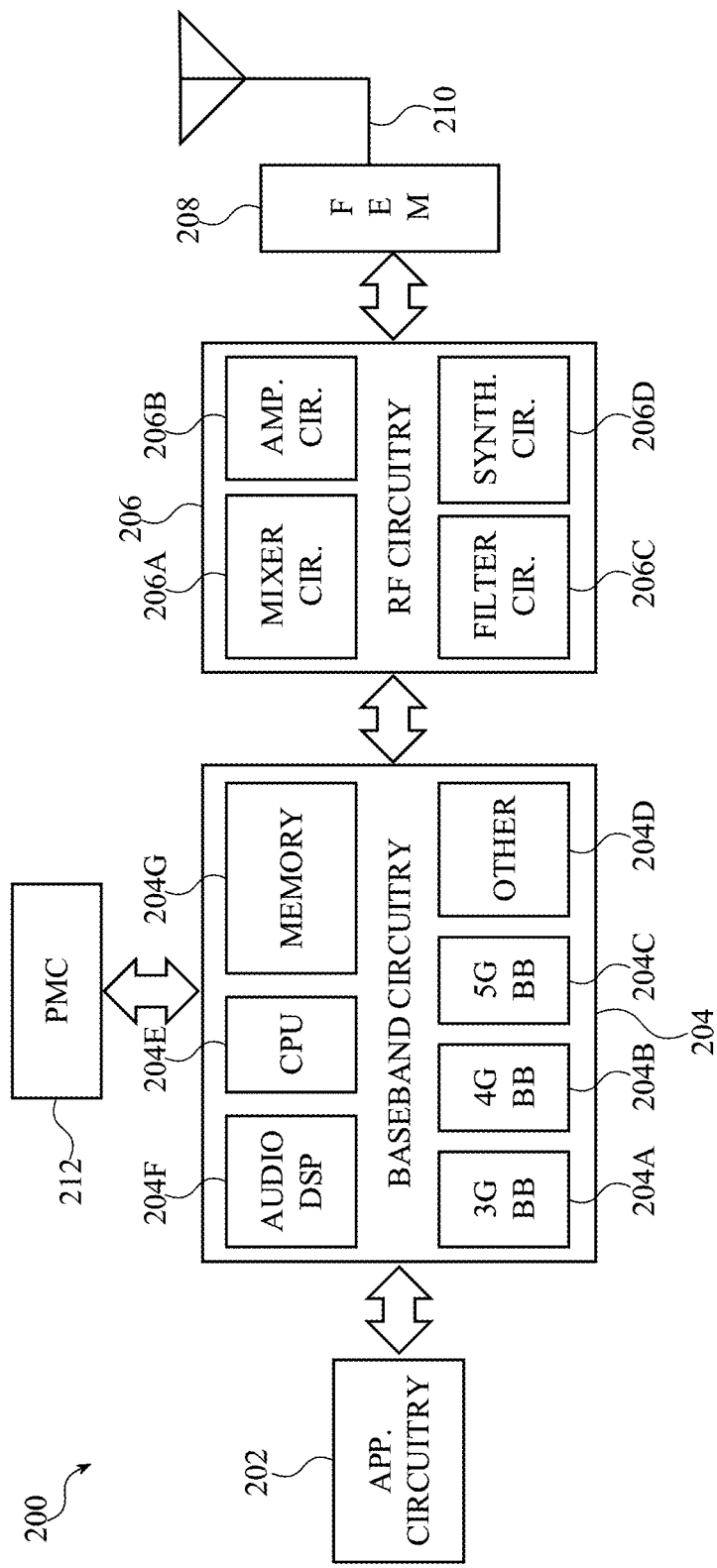
FIG. 2 is an example architecture of a system of a network, in accordance with various aspects.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node, such as UE 101/102, or eNB/gNB 111/112. In some aspects, the device 200 can include less elements (e.g., a RAN node can not utilize application circuitry 202, and instead include a processor/controller to process IP data received from an EPC). In some aspects, the device 200 can include additional elements such as, for example, memory/storage, display, camera, sensor, or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In addition, the memory 204G (as well as other memory components discussed herein, e.g., memory, data storage, or the like) can comprise one or more machine-readable medium/media including instructions that, when performed by a machine or component herein cause the machine to perform acts of the method or of an apparatus or system for concurrent communication using multiple communication technologies according to aspects and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In some aspects, the baseband circuitry 204 can include one or more audio digital signal processor(s) (DSP) 204F. The audio DSP(s) 204F can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with an evolved universal terrestrial radio access network (EUTRAN) or other wireless metropolitan area networks (WMAN), a wireless local area network (WLAN), a wireless personal area network (WPAN). Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206a, amplifier circuitry 206b and filter circuitry 206c. In some aspects, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some aspects, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In some aspects, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some aspects, the mixer circuitry 206a of the receive signal path and the mixer circuitry 206a of the transmit signal path can include two or more mixers and can be arranged for quadrature downconversion and upconversion, respectively. In some aspects, the mixer circuitry 206a of the receive signal path and the mixer circuitry 206a of the transmit signal path can include two or more mixers and can be arranged for image rejection (e.g., Hartley image rejection). In some aspects, the mixer circuitry 206a of the receive signal path and the mixer circuitry 206a can be arranged for direct downconversion and direct upconversion, respectively. In some aspects, the mixer circuitry 206a of the receive signal path and the mixer circuitry 206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206d can be a fractional-N synthesizer or a fractional N/N+1 synthesizer, although the scope of the aspects is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some aspects, the synthesizer circuitry 206d can be a fractional N/N+1 synthesizer.

In some aspects, frequency input can be provided by a voltage-controlled oscillator (VCO), although that is not a requirement. Divider control input can be provided by either the baseband circuitry 204 or the applications processor 202 depending on the desired output frequency. In some aspects, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through the transmit or receive signal paths can be done solely in the RF circuitry 206, solely in the FEM 208, or in both the RF circuitry 206 and the FEM 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 illustrates the PMC 212 coupled only with the baseband circuitry 204. However, in other aspects, the PMC 212 can be additionally or alternatively coupled with, and perform similar power management operations for, other components such as, but not limited to, application circuitry 202, RF circuitry 206, or FEM 208.

In some aspects, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it transitions back to RRC_Connected state.

For low latency/low power operations, the device 200 can be configured to suspend/resume in 5G NR by utilizing the RRC_Inactive state, which can significantly reduce latency and minimize the battery consumption. In the suspend procedure, both the UE and the RAN store information about the UE transition from connected to inactive, along with the UE radio protocol configuration. The resume procedure optimizes the transition from inactive to connected by restoring the UE radio protocol configuration. RAN-based location management and RAN paging make it possible for UEs in the inactive state to move around in an area without notifying the network.

Processors of the application circuitry 202 and processors of the baseband circuitry 204 can be used to execute elements of one or more instances of a protocol stack. For example, processors of the baseband circuitry 204, alone or in combination, can be used to execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
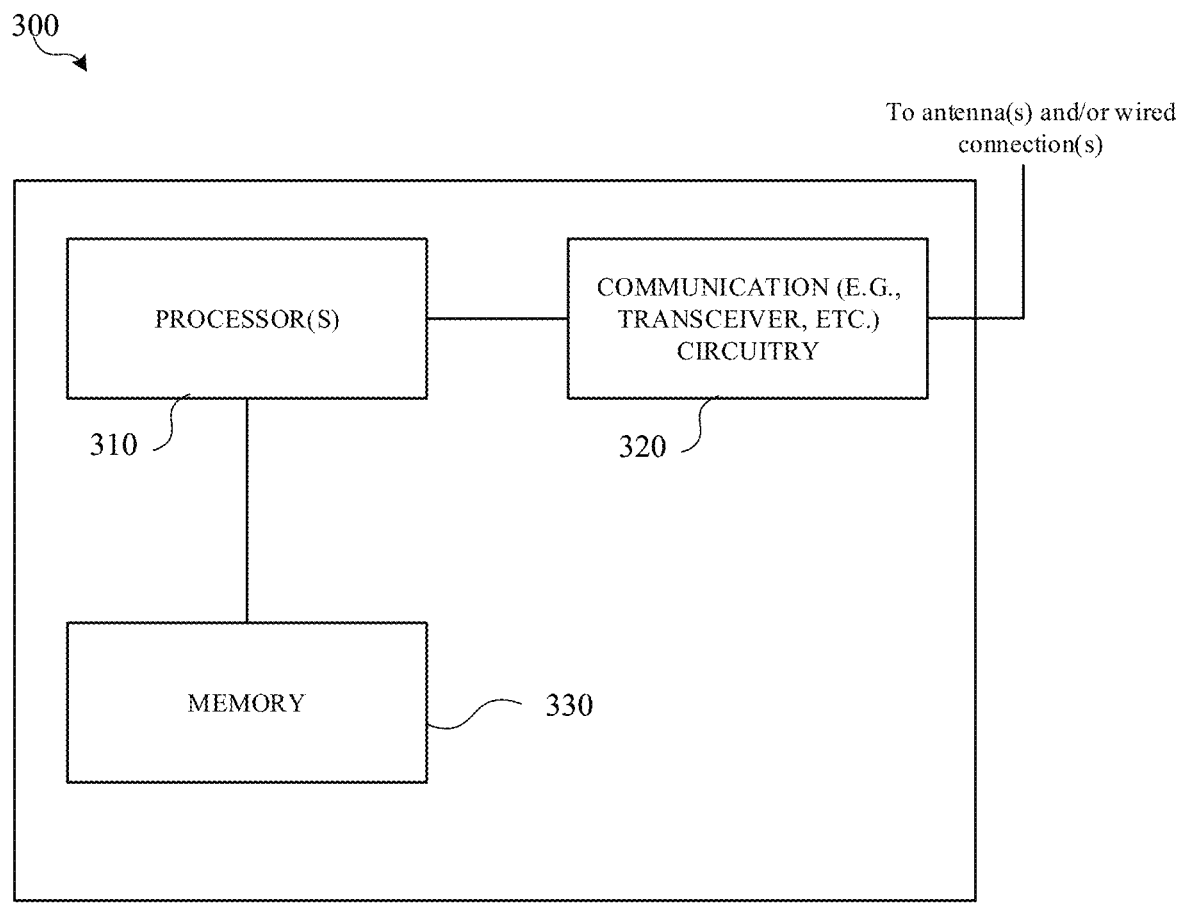
FIG. 3 is an exemplary a simplified block diagram of a user equipment wireless communication device or other network device/component (e.g., gNB) in accordance with various aspects described.

Referring to FIG. 3, illustrated is a block diagram of a user equipment wireless communication device (UE) or other network device/component (e.g., gNB, eNB, or other participating network entity/component). The UE device 300 includes one or more processors 310 (e.g., one or more baseband processors) comprising processing circuitry and associated interface(s), transceiver circuitry 320 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 330 (which can comprise any of a variety of storage mediums and can store instructions and/or data associated with one or more of processor(s) 310 or transceiver circuitry 320).

In various aspects (aspects) discussed herein, signals or messages can be generated and output for transmission, and/or transmitted messages can be received and processed. Depending on the type of signal or message generated, outputting for transmission (e.g., by processor(s) 310, processor(s) 310, etc.) can comprise one or more of the following: generating a set of associated bits that encode the content of the signal or message, coding (e.g., which can include adding a cyclic redundancy check (CRC) and/or coding via one or more of turbo code, low density parity-check (LDPC) code, tail-biting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 310) can comprise one or more of: identifying physical resources associated with the signal/message, detecting the signal/message, resource element group de-interleaving, demodulation, descrambling, and/or decoding.

According to various aspects, discontinuous reception (DRX) in NR is configured to optimize power consumption at the UE 101 while still allowing substantial flexibility in scheduling transmissions to the UE 101.

One consequence of the requirement to perform LBT is that transmissions can be delayed. If a gNB 110 has data for a UE 101 and a UE 101 is in its active time (awake and not asleep in idle mode itself), the gNB 110 can still not necessarily be able to transmit to the UE 101 because the channel is busy. This is natural given the shared nature of the unlicensed medium; however, it implies that in order to achieve the same latency for the data, the network (or gNB 110) has to configure DRX for the UE 101 such that the UE 101 wakes up more often (e.g., a shorter DRX cycle than prior to the (re) configuration of DRX) or stays awake longer (e.g., DRX duration is lengthened). In fact, it has been shown in past studies for LTE license assisted access (LAA), that even modest increases in activity on the carrier significantly increase the required active time (and correspondingly power consumption of the UE 101).

Various aspects (aspects) enable the detection of a human body or other biological entity within a distance (e.g., 15 cm, or other distance) of the network device or UE 101. In response to such a detection, the UE 101 or network device 110 can back off the transmit power for a safe electromagnetic frequency (EMF) emission distance, which can be dynamically updated or modified according to various safety/regulatory standards given a particular country, region, or study. Rather than immediately implement such BPS operations at start-up of mmW operation, various mechanisms can ensure greater efficiency in power and battery consumption while also maintaining safety. Such mechanisms/operations take advantage of the fact that mmW communication typically uses more power than existing LTE technology, as combination of BPS and mmW operation can exacerbate the power situation of the device.

Network devices such as UE 101 or eNB/gNB 110 can operate to prevent biological hazard by the accumulation of non-ionizing radiation such as EMF by generating BPS operations. Upon detection of a maximum permissible exposure (MPE) event, in which mmW transmission is occurring at or beyond regulated frequencies within a defined distance (e.g., 15 cm or the like), a back-off of transmission can be initiated.

An MPE can be implemented and configured to prevent from established adverse health effects associated with exposure to RF EMF, such as safety guidelines that have been published by the International Commission on Non-Ionizing Radiation Protection, or are associated with regulations that may vary across various regions or nations. FIG. 4 demonstrates one example of Sub-6 vs mmWave Exposure, and an example, which shows on set of regulations. Millimeter wave, or mmWave, 5G is named in reference to the relatively short distance between radio wave peaks when broadcasting at very high frequencies; higher frequencies have more energy. These frequencies range from 24 GHz up to around 39 GHz, or higher. This spectrum is available in large chunks allowing for very fast transmission speeds with a strong signal. Sub-6 GHz 5G refers to 5G deployments using spectrum under 6 GHz.

In an aspect, the UE 101 can receive a data set or table of safe transmit power levels associated with a plurality of applicable bands. In response to a BSP operation detecting an MPE event, the UE 101 can further identify/determine a maximum safe transmit power level as the safe transmit power level based on the data set or table for the applicable band(s). In case multiple bands are utilized, a minimum band can be selected from a subset of the plurality of applicable bands for determining the maximum safe transmit power based on the data set or table. If the transmit power for mmW is less than an entry in the data set or table, for example, such as for a particular region, distance or other criteria, then the UE 101 can suspend BPS operations, for example, and thus the UE pauses or halts performing BPS operation based on one or more conditions to reduce or optimize power efficiency and battery.

In an aspect, the UE 101 can receive a modified table from the eNB/gNB 110, a higher layer signaling, or as a pre-defined specification. The UE 101 can then select a band or power level upon which to back off to in response to an MPE event being triggered by BPS.

Figure 5:
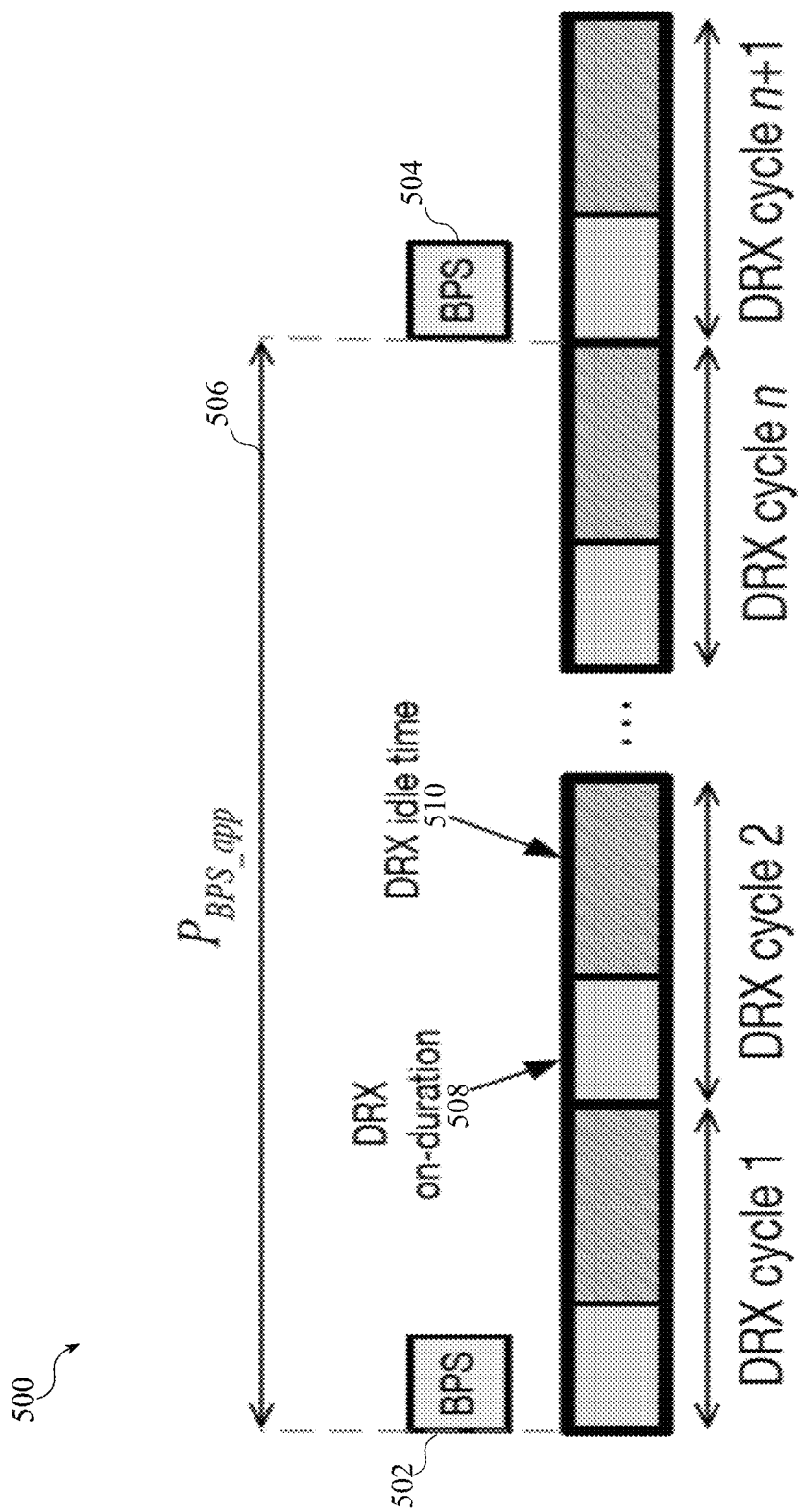
FIG. 5 is an example an example process flow configuring BPS in alignment with discontinuous reception (DRX) according to various aspects described herein.

FIG. 5 illustrates an example of BPS operational activity 500 being configured to discontinuous reception (DRX) in accord with various aspects. In order to strike a balance between measures to meet regulatory requirements and optimizing performance various conditions can be configured so that the UE 101 can halt or suspend BPS operations in response to one or more of the conditions being satisfied. In some aspects, the UE maintains a table of safe transmit power levels per frequency band. During normal operation, if configured transmit power for mmW is less than the entry in this table which corresponds to the applicable frequency band, then the UE shall not perform BPS.

In some aspects, in RRC_CONNECTED state, the UE shall align BPS with discontinuous reception (DRX) on-duration times 508. The DRX cycles (DRX cycle 1, DRX cycle 2, . . . DRX cycle n, DRX cycle n+1) each comprise a DRX on-duration 508 and a DRX idle time 510 as a part of the discontinuous reception signaling. The on-duration time 508 can operates as a condition for activating/aligning the BPS operations and the DRX idle time 510 for suspending BPS at that time.

In an aspect, a target BPS period can be received or determined in order to align with the DRX signaling. Parameters related to DRX can be known or determined so that the UE 101 or other network device aligns the BPS operations (BPS sensing) to power on and operate at the beginning of a DRX cycle (on-time 508 and an idle time 504). Thus, the BPS period (including the duration or time between BPS operations) can be configured and aligned from the start or initial beginning of a DRX on-time 508 at a first BPS operation 502 up to a next BPS operation 504. As such a saving of energy can be configured by aligning with the on-times for DRX already utilizing power in an RRC_connected state.

For example, a target BPS period can be defined/received/determine such that DRX can be configured (long) DRX cycle in the RRC connected (RRC_CONNECTED) state. Because the target BPS may not always align symmetrically or exactly to the DRX cycle of on-duration 508 and idle time 510, then the applicable BPS period 506 can be determined. The applicable BPS period 506 can be determined as follows:

$$P_{BPS\_app} \begin{cases} \text{floor}\left(\frac{P_{BPS\_target}}{DRX \text{ cycle}}\right) \times DRX \text{ cycle}, & \text{if } P_{BPS\_target} \geq DRX \text{ cycle} \\ P_{BPS_{target}}, & \text{Otherwise} \end{cases}.$$

If the applicable BPS period can be a floor function of a ratio of a target BPS target period (e.g., so many milliseconds or other duration) divided by the duration of a DRX cycle (the on-duration 508 plus the idle time 510) on condition that the BPS_target is greater than or equal to the DRX cycle; otherwise the applicable BPS period is the target BPS period, regardless of an alignment. The DRX cycle as a divisor can be the DRX cycle period, while the multiplied DRX cycle could be a unit change to get the applicable BPS in a uniform unit of measure (e.g., milliseconds or other unit of measure).

In some aspects, the BPS 502, 504 can be aligned with the DRX cycle in response to a condition that the configured DRX cycle is close to, or satisfies, a proximate threshold to a target BPS period. For example, the applicable BPS period can be configured as follows:

$$P_1 = \text{floor}\left(\frac{P_{BPS\_target}}{DRX \text{ cycle}}\right) \times DRX \text{ cycle},$$

such that the applicable BPS can be equal to P1 if then:

$$\frac{P_1}{P_{BPS\_target}} \geq \text{threshold}, P_{BPS\_app} = P_1; \text{else } P_{BPS\_app} = P_{BPS\_target}$$

and where 0<threshold≤1.

The BPS alignment 500 can be aligned as an ideal example as illustrated in FIG. 5. This figure illustrates BPS activity that is aligned with DRX, where n=floor $$\left(\frac{P_{BPS\_app}}{DRX \text{ cycle}}\right).$$

Here, n can be me aligned period based on a floor function than take as input any number or real number and give an output as the greatest integer less than or equal to the ratio denoted, as opposed to a ceiling where a least integer is greater than or equal to what is denoted, for example, and could likewise be utilized as aspects herein.

In some aspects, the UE 101 configures or suspends BPS based on the conditions comprising an RRC state (e.g., an RRC_IDLE state, an RRC_INACTIVE state, or an RRC_CONNECTED state). For example, the UE 101 could not perform BPS in RRC_IDLE or RRC_INACTIVE states because it does not make any transmissions in either of these states.

In other example, in RRC_CONNECTED state, if semi-persistent scheduling (SPS) is configured for NR in DL or Configured Grant is configured for UL, the UE 101 can be configured to align BPS with either the SPS period $P_{SPS}$ or the Configured Grant period $P_{CG}$. The SPS period or the Configured Grant period could be selected based on whichever is closer to a multiple of the target BPS period (e.g., $P_{BPS\_target}$).

In other words, let $P_{SPS}$ be the SPS period (if configured) and let $P_{CG}$ be the Configured Grant period for UL (if configured). If $P_{SPS} > P_{BPS\_target}$ or SPS is not configured, then UE 101 does not use the SPS period (_use_sps=FALSE), else _use_sps=TRUE such that $$P_d = \left(\frac{P_{BPS\_target}}{P_{SPS}}\right) \times P_{SPS};$$

and Pd can be the applicable BPS period for alignment base on the SPS.

In aspects, if $$\frac{P_d}{P_{BPS\_target}}$$

≤a threshold, then then _use_sps=FALSE, where 0<threshold≤1. In other words if a ratio or multiple of the floor function with a PBS target associated with the SPS period as an applicable BPS period $P_d$ is less than or equal to a threshold between zero and 1, then the function floor $$\left(\frac{P_{BPS\_target}}{P_{SPS}}\right) \times P_{SPS}$$

can be used as the applicable BPS period for alignment based on the SPS period.

In aspects, if $P_{CG} > P_{BPS\_target}$ or UL ConfiguredGrant is not configured, then use of the Configured Grant period is not utilize (_use_cg=FALSE), else the Configured Grant period can be used (_use_cg=TRUE) such that $P_u$=floor $$\left(\frac{P_{BPS\_target}}{P_{CG}}\right) \times P_{CG},$$

where $P_u$ can be the applicable BPS period for alignment based on the Configured Grant.

In some aspects, if $$\frac{P_u}{P_{BPS\_target}}$$

threshold, then _use_cg=FALSE, where 0<threshold≤1. In other words if a ratio or multiple of the floor function with a PBS target associated with the configured grant period as an applicable BPS period $P_u$ is less than or equal to a threshold between zero and 1, then the function floor $$\left(\frac{P_{BPS\_target}}{P_{CG}}\right) \times P_{CG},$$

can be used as the applicable BPS period for alignment based on the SPS period.

In an aspect, if neither SPS or Configured Grant is configured, then the applicable default alignment as the applicable BPS period can equal the target BPS period. In other words, if _use_sps=FALSE and _use_cg=FALSE, then $P_{BPS\_app}=P_{BPS\_target}$. However, if SPS is configured and Configured grant is not, then the applicable BPS period equals the associated SPS period dependent floor function. In other words, else if _use_sps=TRUE and _use_cg=FALSE, then $P_{BPS\_app}=P_d$. Likewise, if Configured Grant is configured and SPS is not, then the applicable BPS period can be the associated Configured Grant period dependent floor function. In other words, else if _use_sps=FALSE and _use_cg=TRUE, then $P_{BPS\_app}=P_u$. Further, if the floor function based on the associated Configured grant period is less than the floor function based on the associated SPS period, then the applicable BPS period to be aligned can be the Configured Grant based floor function; in other words, else if $P_u < P_d$, then $P_{BPS\_app}=P_u$, else $P_{BPS\_app}=P_d$.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or aspects of the description herein. Further, one or more of the acts depicted herein can be carried out in one or more separate acts and/or phases. Reference can be made to the figures described above for ease of description. However, the methods are not limited to any particular aspect or example provided within this disclosure and can be applied to any of the systems disclosed herein.

Figure 6:
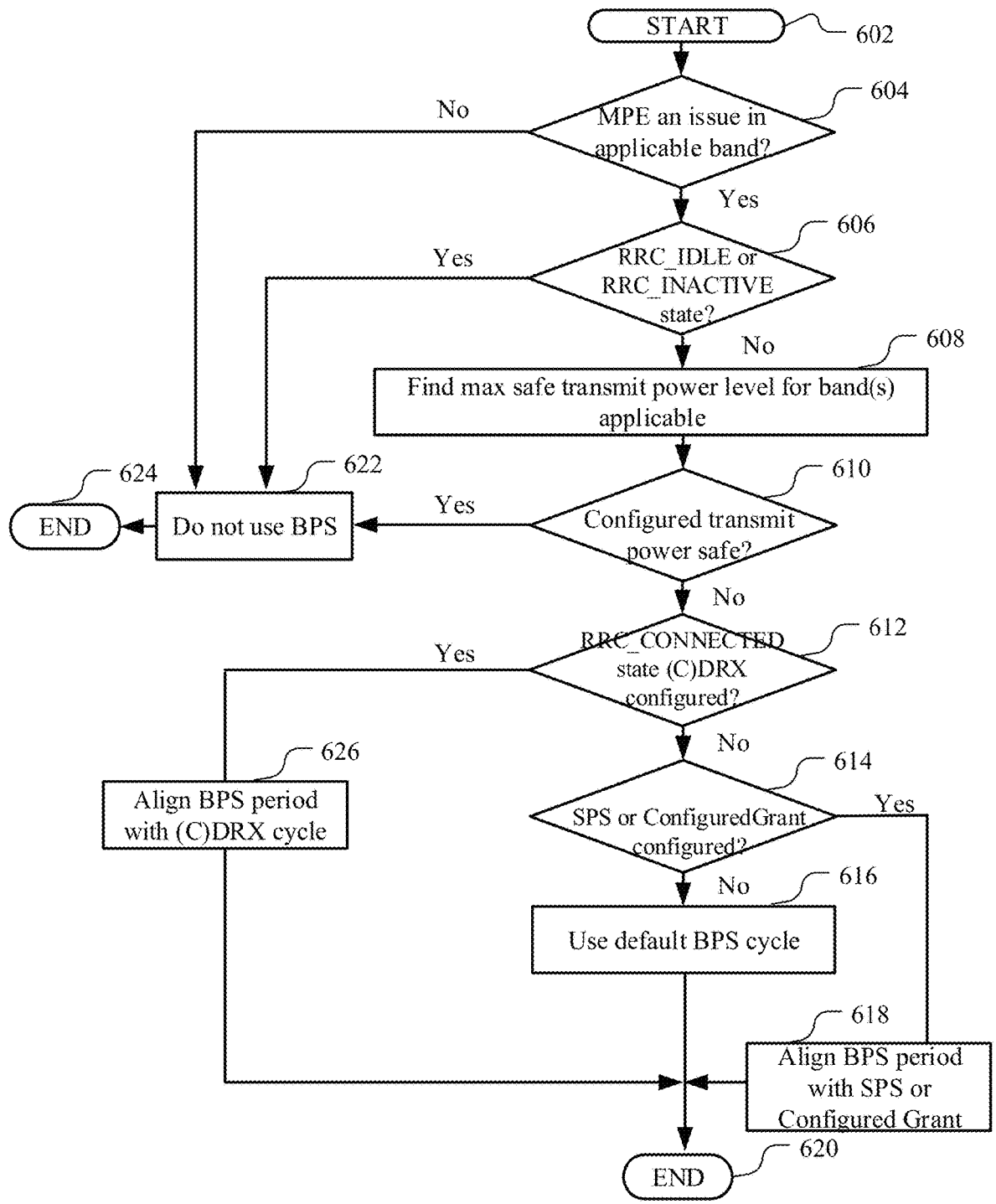
FIG. 6 is an example process flow configuring BPS according to various aspects described herein.

FIG. 6 illustrates an example process flow 600 for a network device or component (e.g., UE 101, gNB 110, or other network component) to perform reduction or suspension of BPS operations where there is an MPE issue at one or more bands in accord with various aspects. At 602, the process flow initiates and at 604 a determination is made whether MPE is an issue in one or more applicable bands. If no, the process flow flows to 622 where BPS is not used, and the process flow ends 624 or repeats. If yes, the process flow moves to a decision 606, to determine whether the UE 101 is configured in RRC_IDLE or RRC_INACTIVE. If yes, the process flow flows to 622 where BPS is not used, and the process flow ends 624 or repeats. If no, then a maximum safe transmit power level is determine for the one or more bands applicable. This can be determined based on a data set or data table with entries to harm levels, recommended levels or regulated levels of safe operation based on a region, jurisdiction or standard body, for example. If more than one band is applicable, then a minimum of the bands or entry level can be used.

A further decision can be made at 610 as to whether a configured transmit power is safe. If yes, the process flow flows to 622 where BPS is not used, and the process flow ends 624 or repeats. If no, the process flows to the decision 612 to determine whether the UE is in RRC connected state and DRX/connected mode DRX (CDRX) is configured. If yes, the process flows to 626 where an alignment of the BSPS with the (C)DRX cycle is made based on the aspects herein. If no, then the process flows to the decision 614 to determine if SPS or Configured Grant is configured. If yes, then the process flows to 626 where an alignment of the BPS with the SPS or the ConfiguredGrant is made based on the aspects herein. If no, the process flows to 616 to use a default BPS or the target BPS as defined.

Figure 7:
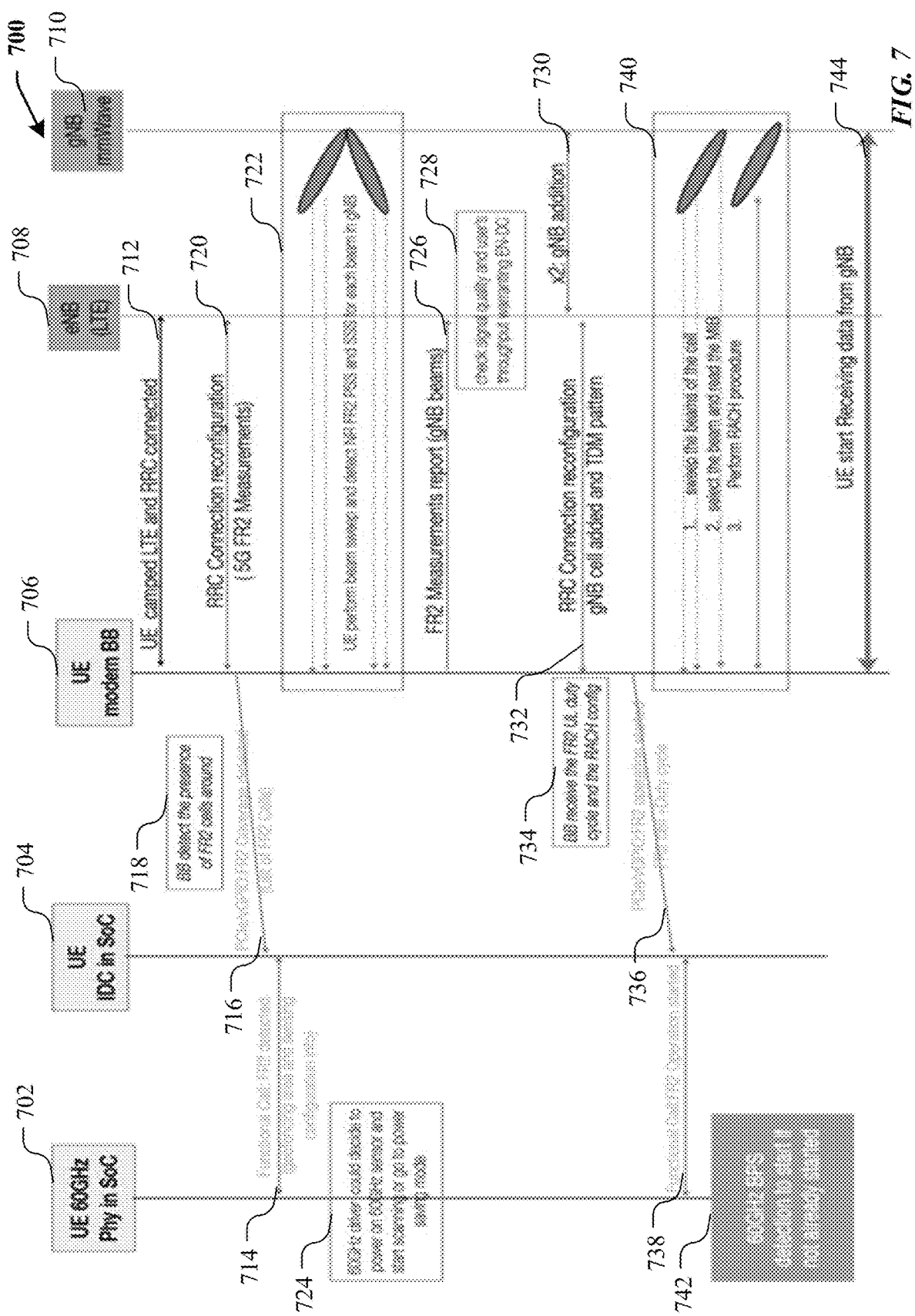
FIGS. 7-8 an example component flow configuring BPS according to various aspects described herein.

Referring to FIG. 7, illustrated is an example component flow 900 for a network device or components (e.g., UE 101, gNB 110, or other network component) to perform and configure BPS for MPE events while optimizing power efficiencies. The network components include a UE operating at or up to 60 GHz for mmWave in the physical (PHY) layer a system on a chip (SoC) 702, a UE in-device coexistence in SoC 704, a UE modem baseband 706, an eNB in LTE 708, and a gNB 710 mmWave configured.

At 712, the UE is camped LTE and RRC connected, but if not then BPS does not need to be done at the UE 702. At 714, a functional call can be initiated and frequency range (FR2) detected. Geofencing area and sending configuration info can be exchanged between UE 702 and UE 704. At 716 peripheral component interconnect express (PCIe)/virtual general purpose input output (vGPIO) bits can be exchanged for FR2 coverage detected. This can include a list of FR2 cells. At 720 RRC connection reconfiguration can be established with 5G FR2 measurements. At 722, a UE performs beam sweeping and detection of NR FR2 primary synchronization signals (PSS) and secondary synchronization signals (SSS) for each beam in the gNB 720. During this time the UE 702 at 724 60 GHz driver could decide to power on 60 GHz sensor for sensing and start scanning or go into a saving mode of operation (e.g., idle or other inactive state).

FR 2 measurements are reported with the gNB beams at 726 and a check of signal quality and the user's throughput can warrant E-UTRAN New Radio Dual Connectivity (EN-DC) at 728. In x2, the gNB processes a link addition at 730 with eNB 708 in backhaul. At 732, an RRC configuration reconfiguration is exchanged with the gNB cell being added and a time division multiplexing (TDM) pattern. AT 734 the baseband receives the FR2 UL duty cycle and random access channel configuration. The UE 706 then provides PCIe/vGPIO bits 736 for FR2 operation being starts with FR2 cell and associated duty cycle. At 738, message is provided for functional call and FR2 operation being started.

At 740 a sweep of beams of the cell can be performed, along with a selection of the beam and read of the master information bit (MIB) and a RACH procedure being performed. At 742, 60 GHz BPS detection initiates if not already. At 744, the UE begins receiving data from the gNB.

Figure 8:
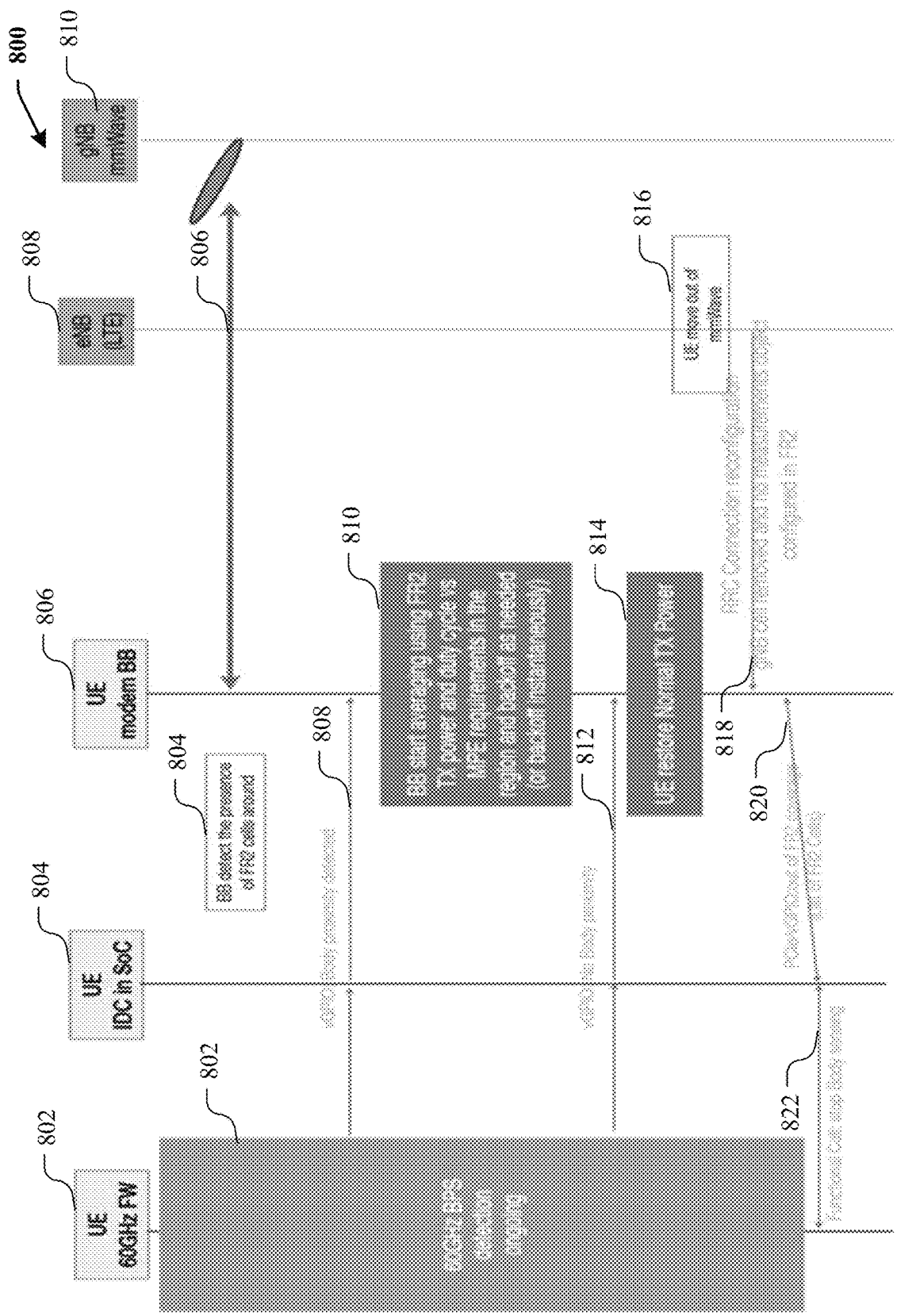

FIG. 8 is a further component flow example as a continuation of the previous component flow of FIG. 7. At 802, 60 GHz detection is ongoing and can be suspended based on the aspects described herein or the various conditions. AT 804, the baseband detects the presence of FR2 cells around and at 806 and exchange of beam information can be generated. At 808 vGPIO bits related to body proximity being detected (e.g., as an MPE event). At 810, the baseband can start averaging using FR2 transmit power and duty cycle according to the MPE requirements in a particular region or data set/table and back-off in power as needed or back-off instantaneously. At 812, no proximity is detected, and at 814 the UE restores to normal transmit power as a result. At 816, the UE moves out of mmWave and at 818 RRC connection configuration can be exchanged with the gNB cell removes and n measurement object being configured in FR2, for example. An exchange of bits as PCIe/vGPIO bits 820 and a functional call to stop body sensing at 822 occurs. These various component flows can be example flows by which any one or more of the aspects herein can be utilized.

Figure 9:
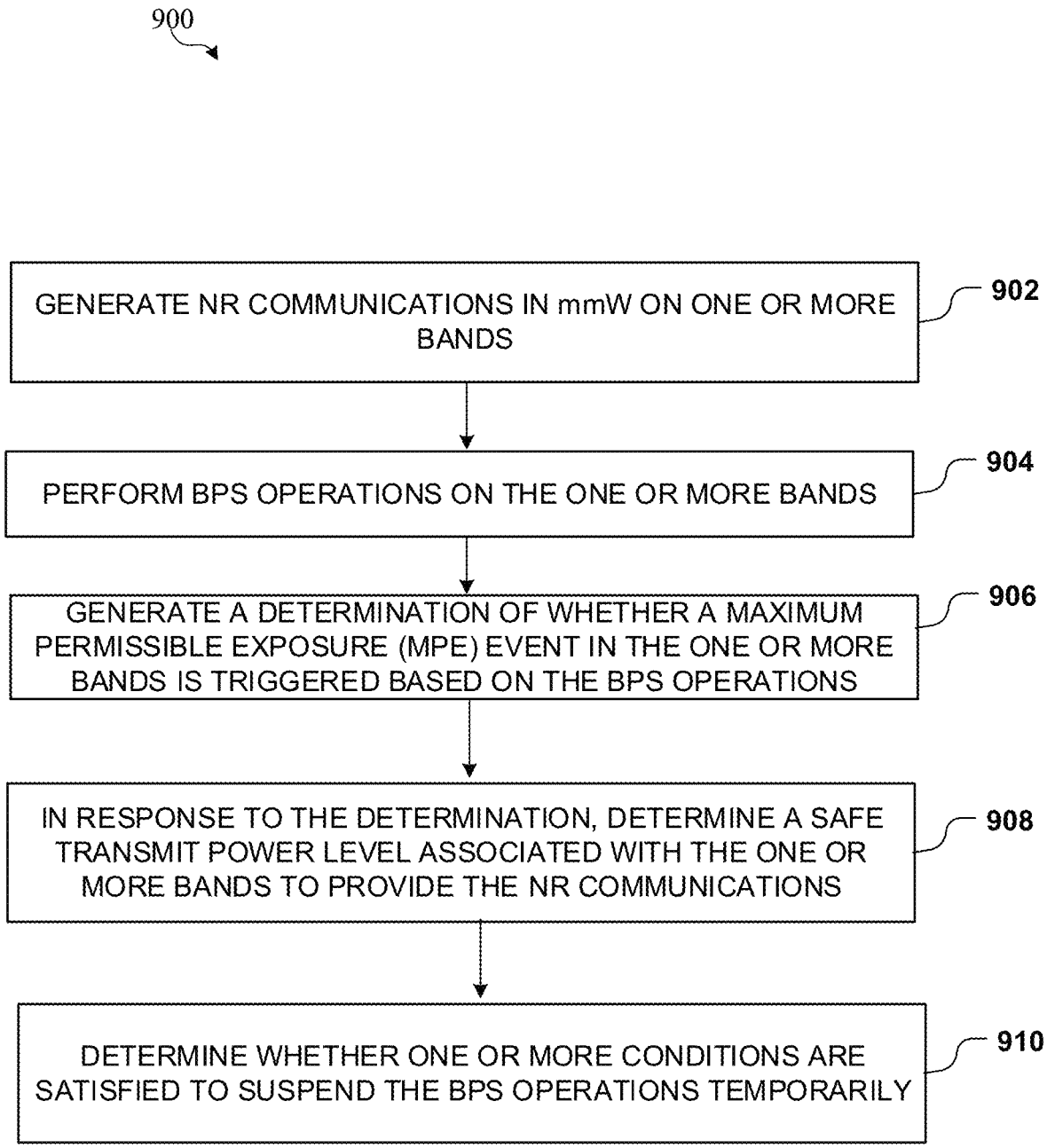
FIG. 9 is an example process flow configuring BPS operations according to various aspects described herein.

Referring to FIG. 9, illustrated is a process flow 900 for configuring BPS operations in mmW communications for the detection of an MPE event or issue in accord with various aspects or aspects. At 902, the process flow 900 initiates with generating NR communications in millimeter wave (mmW) frequency on one or more bands.

At 904, the process flow 900 further comprises performing body proximity sensing (BPS) operations on the one or more bands. At 906, the process flow further comprises generating a determination of whether a maximum permissible exposure (MPE) event in the one or more bands is triggered based on the BPS operations. At 908 the process flow 900 further includes determining a safe transmit power level associated with the one or more bands to provide the NR communications in response to the determination. At 910, the process flow 900 further comprises determining whether one or more conditions are satisfied to suspend the BPS operations temporarily.

Figure 10:
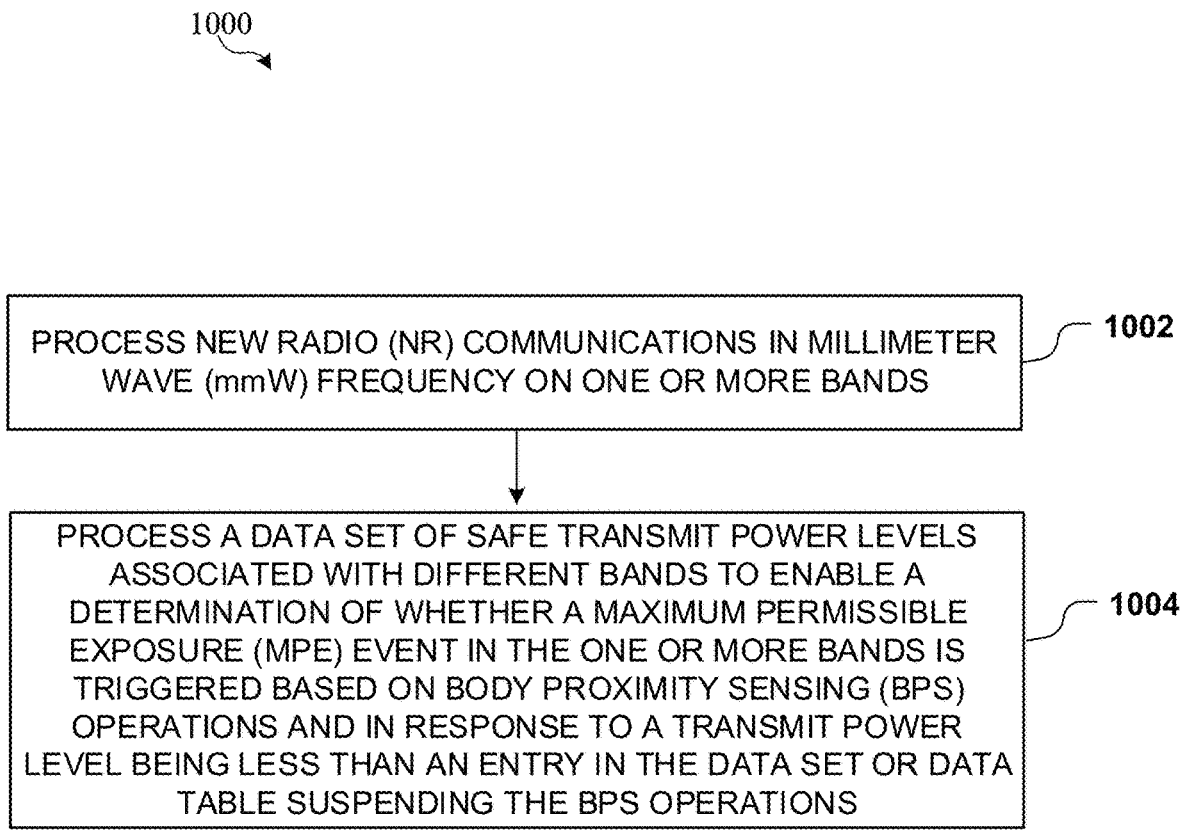
FIG. 10 is another example process flow configuring BPS operations according to various aspects described herein.

Referring to FIG. 10, illustrated is a process flow 1000 for configuring BPS operations in mmW communications for the detection of an MPE event or issue in accord with various aspects or aspects for a network component or access point. The process flow 1000 initiates at 1002 with processing NR communications in mmW frequency on one or more bands. At 1004, the process includes processing a data set of safe transmit power levels associated with different bands to enable a determination of whether an MPE event in the one or more bands is triggered based on body proximity sensing (BPS) operations and in response to a transmit power level being less than an entry in the data set or data table suspending the BPS operations.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (aspects) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to aspects and examples described herein.

A first example is a user equipment (UE), comprising: processing circuitry configured to: determine whether a maximum permissible exposure (MPE) event in an applicable band is triggered based on body proximity sensing (BPS) operations; in response to a determination that the MPE event is triggered, determine a safe transmit power level associated with the applicable band by which to transmit with; and suspend the BPS operations based on the safe transmit power level and one or more conditions being satisfied; a radio frequency (RF) interface, configured to provide, to RF circuitry, data for a millimeter Wave (mmW) transmission at or below the safe transmit power level.

A second example can include the first example, wherein the processing circuitry is further configured to, in response to a transmit power for mmW being less than an entry in a data set, or a data table, suspend the BPS operations.

A third example can include the first or second example, wherein the one or more conditions comprise operating in a radio resource control (RRC) idle state (RRC_IDLE) or a RRC inactive state (RRC_INACTIVE).

A fourth example can include any one or more of the first through third examples, wherein the processing circuitry is further configured to: receive a data set or table of safe transmit power levels associated with a plurality of applicable bands; and determine a maximum safe transmit power level as the safe transmit power level based on the data set or table for the applicable band.

A fifth example can include any one or more of the first through fourth examples, wherein the processing circuitry is further configured to select a minimum band from a subset of the plurality of applicable bands for determining the maximum safe transmit power based on the data set or table when more than one band is being utilized.

A sixth example can include any one or more of the first through fifth examples, wherein the processing circuitry is further configured to, in response to operating in a discontinuous reception (DRX) or a connected mode DRX (CDRX), align a BPS period of the BPS operations with the DRX or the CDRX.

A seventh example can include any one or more of the first through sixth examples, wherein the processing circuitry is further configured to, in response to semi-persistent scheduling (SPS) being configured for NR in downlink (DL) or a configured grant being configured for uplink (UL), align a BPS of the BPS operations with an SPS period or a configured grant period.

An eighth example can include any one or more of the first through seventh examples, wherein the processing circuitry is further configured to suspend the BPS operations based on one or more conditions being satisfied by aligning the BPS at on durations of a DRX cycle or configured grant cycle, according to a first applicable BPS period based on a first floor function of a first ratio of a target BPS period and the DRX cycle, or a second applicable BPS period based on a second floor function of a second ratio of the target BPS period and the configured grant cycle.

A ninth example can include any one or more of the first through eighth examples, wherein the one or more conditions comprise a comparison of the first applicable BPS period and the second applicable BPS period based on a relationship, and the processing circuitry is further configured to select the first applicable BPS period or the second applicable BPS period for the aligning based on the relationship.

A tenth example can be an tangible computer readable storage device storing executable instructions that, in response to execution, cause one or more processors of a user equipment (UE) to perform operations, the operations comprising: generating new radio (NR) communications in millimeter wave (mmW) frequency on one or more bands; performing body proximity sensing (BPS) operations on the one or more bands; generating a determination of whether a maximum permissible exposure (MPE) event in the one or more bands is triggered based on the BPS operations; in response to the determination, determining a safe transmit power level associated with the one or more bands to provide the NR communications; and determining whether one or more conditions are satisfied to suspend the BPS operations temporarily.

An eleventh example can include the tenth example, wherein the operations further comprising: determining whether a discontinuous reception (DRX) satisfies a proximate threshold in relation to a target BPS period.

A twelfth example can include any one or more of the tenth through the eleventh examples, the operations further comprising: aligning a BPS period of the BPS operations with a DRX cycle by aligning a BPS operation at a beginning of a DRX on-duration of a DRX cycle, wherein the one or more conditions comprise a DRX idle time or state.

A thirteenth example can include any one or more of the tenth through the twelfth examples, the operations further comprising: aligning a BPS of the BPS operations with a semi-persistent scheduling (SPS) period or a configured grant period in response to the SPS being configured for new radio in downlink (DL) or a configured grant being configured for uplink (UL), depending on which is closer to a multiple of a target BPS period.

A fourteenth example can include any one or more of the tenth through the thirteenth examples, the operations further comprising: suspending the BPS operations in response to operating in the one or more conditions comprising a radio resource control (RRC) idle state (RRC_IDLE) or a RRC inactive state (RRC_INACTIVE).

A fifteenth example can include any one or more of the tenth through the fourteenth examples, the operations further comprising: in response to the one or more conditions comprising a transmit power for mmW being less than an entry in a data set, or a data table, suspending the BPS operations.

A fifteenth example can include any one or more of the tenth through the fifteenth examples, the operations further comprising: determining an applicable BPS of the BPS operations to align with a semi-persistent scheduling (SPS) period in response to SPS being configured for NR transmission and a target BPS period being greater than the SPS period, wherein the applicable BPS comprises a floor function of the target BPS period over the SPS period.

A sixteenth example can include any one or more of the tenth through the sixteenth examples, the operations further comprising: determining an applicable BPS of the BPS operations to align with a configured grant period in response to a configured grant being configured for NR transmission in uplink and a target BPS period being greater than the configured grant period, wherein the applicable BPS comprises a floor function of the target BPS period over the configured grant period.

An eighteenth example can be a tangible computer readable storage device storing executable instructions that, in response to execution, cause one or more processors of a network components comprising an access point (AP) to perform operations, the operations comprising: processing new radio (NR) communications in millimeter wave (mmW) frequency on one or more bands; and processing a data set of safe transmit power levels associated with different bands to enable a determination of whether a maximum permissible exposure (MPE) event in the one or more bands is triggered based on body proximity sensing (BPS) operations and in response to a transmit power level being less than an entry in the data set or data table suspending the BPS operations.

A nineteenth example can include the eighteenth example, the operations further comprising: modifying the data set or the data table to a modified data set; and selecting a minimum band in response to a plurality of bands being utilized for determining a maximum safe transmit power based on the modified data set.

A twentieth example includes any one or more of the eighteenth through nineteenth examples, the operations further comprising: enabling a default BPS period for the BPS operations in response to a radio resource control (RRC) connected state (RRC_Connected) and absent a semi-persistent scheduling (SPS) or a configured grant being configured.

Any one of the claims can serve as examples one through twenty or twenty-one, for example.

A twenty-second example can include an apparatus comprising means to perform one or more elements of a method described in or related to any of first thru twenty-first examples, or any other method or process described herein.

A twenty-third example can include one or more non-transitory computer-readable media comprising instructions to cause an electronic device, upon execution of the instructions by one or more processors of the electronic device, to perform one or more elements of a method described in or related to any one of the first thru twenty-first examples, or any other method or process described herein.

A twenty-fourth example can include an apparatus comprising logic, modules, or circuitry to perform one or more elements of a method described in or related to any one of the first thru twenty-first examples, or any other method or process described herein.

A twenty-fifth example can include a method, technique, or process as described in or related any one of the first thru twenty-first examples, or portions or parts thereof.

A twenty-sixth example can include an apparatus comprising: one or more processors and one or more computer-readable media comprising instructions that, when executed by the one or more processors, cause the one or more processors to perform the method, techniques, or process as described in or related to any one of the first thru twenty-first examples, or portions thereof.

A twenty-seventh example can include a signal as described in or related to any of examples 1-21, or portions or parts thereof.

A twenty-eighth example can include a datagram, packet, frame, segment, protocol data unit (PDU), or message as described in or related to any one of the first thru twenty-first examples, or portions or parts thereof, or otherwise described in the present disclosure.

A twenty-ninth example can include a signal encoded with data as described in or related to any one of the first thru twenty-first examples, or portions or parts thereof, or otherwise described in the present disclosure.

A thirtieth example can include a signal encoded with a datagram, packet, frame, segment, protocol data unit (PDU), or message as described in or related to any one of the first thru twenty-first examples, or portions or parts thereof, or otherwise described in the present disclosure.

A thirty-first example can include an electromagnetic signal carrying computer-readable instructions, wherein execution of the computer-readable instructions by one or more processors is to cause the one or more processors to perform the method, techniques, or process as described in or related to any one of the first thru twenty-first examples, or portions thereof.

A thirty-second example can include a computer program comprising instructions, wherein execution of the program by a processing element is to cause the processing element to carry out the method, techniques, or process as described in or related to any one of the first thru twenty-first examples, or portions thereof.

A thirty-third example can include a signal in a wireless network as shown and described herein.

A thirty-fourth example can include a method of communicating in a wireless network as shown and described herein.

A thirty-fifth example can include a system for providing wireless communication as shown and described herein.

A thirty-sixth example can include a device for providing wireless communication as shown and described herein.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A user equipment (UE), comprising:
   processing circuitry configured to:
      determine whether a maximum permissible exposure (MPE) event in an applicable band is triggered based on body proximity sensing (BPS) operations;
      in response to a determination that the MPE event is triggered, determine a safe transmit power level associated with the applicable band by which to transmit with; and
      suspend the BPS operations based on the safe transmit power level and one or more conditions being satisfied;
   a radio frequency (RF) interface, configured to provide, to RF circuitry, data for a millimeter Wave (mmW) transmission at or below the safe transmit power level.

2. The UE of claim 1, wherein the processing circuitry is further configured to, in response to a transmit power for mmW being less than an entry in a data set, or a data table, suspend the BPS operations.

3. The UE of claim 1, wherein the one or more conditions comprise operating in a radio resource control (RRC) idle state (RRC_IDLE) or a RRC inactive state (RRC_INACTIVE).

4. The UE of claim 1, wherein the processing circuitry is further configured to:
   receive a data set or table of safe transmit power levels associated with a plurality of applicable bands; and
   determine a maximum safe transmit power level as the safe transmit power level based on the data set or table for the applicable band.

5. The UE of claim 4, wherein the processing circuitry is further configured to select a minimum band from a subset of the plurality of applicable bands for determining the maximum safe transmit power based on the data set or table when more than one band is being utilized.

6. The UE of claim 1, wherein the processing circuitry is further configured to, in response to operating in a discontinuous reception (DRX) or a connected mode DRX (CDRX), align a BPS period of the BPS operations with the DRX or the CDRX.

7. The UE of claim 1, wherein the processing circuitry is further configured to, in response to semi-persistent scheduling (SPS) being configured for NR in downlink (DL) or a configured grant being configured for uplink (UL), align a BPS of the BPS operations with an SPS period or a configured grant period.

8. The UE of claim 1, wherein the processing circuitry is further configured to suspend the BPS operations based on one or more conditions being satisfied by aligning the BPS operations with durations of a DRX cycle or configured grant cycle, according to a first applicable BPS period based on a first floor function of a first ratio of a target BPS period and the DRX cycle, or a second applicable BPS period based on a second floor function of a second ratio of the target BPS period and the configured grant cycle.

9. The UE of claim 8, wherein the one or more conditions comprise a comparison of the first applicable BPS period and the second applicable BPS period based on a relationship, and the processing circuitry is further configured to select the first applicable BPS period or the second applicable BPS period for the aligning based on the relationship.

10. A method for a user equipment (UE) to perform operations via processing circuitry, comprising:
   generating new radio (NR) communications in millimeter wave (mmW) frequency on one or more bands;
   performing body proximity sensing (BPS) operations on the one or more bands;
   generating a determination of whether a maximum permissible exposure (MPE) event in the one or more bands is triggered based on the BPS operations;
   in response to the determination, determining a safe transmit power level associated with the one or more bands to provide the NR communications; and
   determining whether one or more conditions are satisfied to suspend the BPS operations temporarily.

11. The method of claim 10, further comprising:
   determining whether a discontinuous reception (DRX) satisfies a proximate threshold in relation to a target BPS period.

12. The method of claim 11, further comprising:
   aligning a BPS period of the BPS operations with a DRX cycle by aligning a BPS operation at a beginning of a DRX on-duration of a DRX cycle, wherein the one or more conditions comprise a DRX idle time or state.

13. The method of claim 10, the operations further comprising:
   aligning a BPS of the BPS operations with a semi-persistent scheduling (SPS) period or a configured grant period in response to the SPS being configured for new radio in downlink (DL) or a configured grant being configured for uplink (UL), depending on which is closer to a multiple of a target BPS period.

14. The method of claim 10, further comprising:
   suspending the BPS operations in response to operating in the one or more conditions comprising a radio resource control (RRC) idle state (RRC_IDLE) or a RRC inactive state (RRC_INACTIVE).

15. The method of claim 10, further comprising:
in response to the one or more conditions comprising a transmit power for mmW being less than an entry in a data set, or a data table, suspending the BPS operations.

16. The method of claim 10, further comprising:
determining an applicable BPS of the BPS operations to align with a semi-persistent scheduling (SPS) period in response to SPS being configured for NR transmission and a target BPS period being greater than the SPS period, wherein the applicable BPS comprises a floor function of the target BPS period over the SPS period.

17. The method of claim 10, further comprising:
determining an applicable BPS of the BPS operations to align with a configured grant period in response to a configured grant being configured for NR transmission in uplink and a target BPS period being greater than the configured grant period, wherein the applicable BPS comprises a floor function of the target BPS period over the configured grant period.

18. A base station comprising:
a memory; and
processing circuitry configured to:
 process new radio (NR) communications in millimeter wave (mmW) frequency on one or more bands; and
 process a data set of safe transmit power levels associated with different bands to enable a determination of whether a maximum permissible exposure (MPE) event in the one or more bands is triggered based on body proximity sensing (BPS) operations and in response to a transmit power level being less than an entry in the data set or data table suspending the BPS operations.

19. The base station of claim 18, wherein the processing circuitry is further configured to:
modify the data set or the data table to a modified data set; and
select a minimum band in response to a plurality of bands being utilized for determining a maximum safe transmit power based on the modified data set.

20. The base station of claim 18, wherein the processing circuitry is further configured to:
enable a default BPS period for the BPS operations in response to a radio resource control (RRC) connected state (RRC_Connected) and absent a semi-persistent scheduling (SPS) or a configured grant being configured.

* * * * *